United States Patent [19]

Sakaguchi et al.

[11] Patent Number: 5,461,446
[45] Date of Patent: Oct. 24, 1995

[54] PHOTOSENSITIVE MATERIAL PROCESSING APPARATUS

[75] Inventors: Yasunobu Sakaguchi, Kanagawa; Mamoru Ogasawara; Koji Nakajima, both of Saitama, all of Japan

[73] Assignees: Fuji Photo Film Co., Ltd., Kanagawa; Fuji Photo Optical Co., Ltd., Saitama, both of Japan

[21] Appl. No.: 154,435

[22] Filed: Nov. 19, 1993

[30] Foreign Application Priority Data

Nov. 19, 1992 [JP] Japan ................................. 4-310490

[51] Int. Cl.⁶ ............................................. G03D 13/00
[52] U.S. Cl. .......................... 354/297; 354/331; 354/339; 355/27
[58] Field of Search ................................. 354/321, 322, 354/339, 297, 331; 355/38, 40, 41, 68, 27–29

[56] References Cited

U.S. PATENT DOCUMENTS

| | | | |
|---|---|---|---|
| 4,903,100 | 2/1990 | Kogane et al. | 354/322 X |
| 5,036,402 | 7/1991 | Shiota | 355/20 |
| 5,083,154 | 1/1992 | Terashita et al. | 355/68 |

Primary Examiner—D. Rutledge
Attorney, Agent, or Firm—Sughrue, Mion, Zinn, Macpeak & Seas; Richard C. Turner; Steven M. Gruskin

[57] ABSTRACT

A photosensitive material processing apparatus which performs, with high accuracy, the positioning of a negative table, an optical system supporting member, a guide member for photographic paper, a conveying member, a development portion, a drying portion and a cutting portion relative to each other on a base member by means of positioning members. As a result, a high quality image can be reliably obtained and the photographic paper can be accurately conveyed.

16 Claims, 13 Drawing Sheets

PHOTOSENSITIVE MATERIAL PROCESSING APPARATUS

BACKGROUND OF THE INVENTION

1. Field of the Invention

The present invention relates to a photosensitive material processing apparatus which exposes an image on a negative film onto a photographic paper and which is suitable for use in a device such as a printer-processor.

2. Description of the Related Art

In a photosensitive material processing apparatus, a printer-processor is sometimes referred to as a "mini-laboratory" and is installed in a photo processing shop or the like. An exposure portion which exposes an image recorded on a negative film is integrated with a processor portion which develops an exposed photographic paper. This elongated photographic paper can be automatically conveyed and processed within the exposure portion and the processor portion after inserting the photographic paper in the printer-processor. In the exposure portion of this printer-processor, an image of the negative film is enlarged to a given size and is printed onto the photographic paper. The photographic paper is sequentially carried to the processor portion wherein the photographic paper is developed, and is finished as a photographic print.

The elongated photographic paper is wound in roll-form and accommodated in a magazine which prevents light from entering. The photographic paper is sequentially pulled out of the magazine each time the photographic paper is exposed or the like.

The photographic paper which is pulled out of the magazine by a predetermined length is held and conveyed by a conveying roller, and an image is simultaneously exposed onto the photographic paper. In addition, the photographic paper is developed, fixed, and washed in water in the processor portion, and is thereafter dried.

In this conventional photosensitive material processing apparatus, the elongated photographic paper, which is wound in roll-form, is conveyed from the magazine by a conveying roller, and at the same time, is processed. Accordingly, in order-to properly process the photographic paper and obtain a high-quality image, an optical axis of the negative film and the center of the photographic paper must be aligned with each other. At the same time, the photographic paper must be properly conveyed without moving in a zigzag manner or the like. For this reason, it is necessary to determine with high accuracy the positional relationship between an optical system supporting member for supporting a negative film, a lens and the like, and the photographic paper. Further, it is also necessary to position with high accuracy not only the conveying member for conveying the photographic paper within the printer-processor, but also a development portion or the like, next to the carrier member.

Since respective positions of the optical system supporting member, an exposure stage which guides the photographic paper, the conveying member, and the development portion and the like are separately adjusted, alignment of these members is difficult.

SUMMARY OF THE INVENTION

In view of the aforementioned problems, it is an object of the present invention to provide a photosensitive material processing apparatus which, in order to maintain the quality of an image and at the same time reliably convey a photographic paper, is capable of effecting a mutual positioning of each member with high accuracy when each member is mounted to the apparatus.

According to a first aspect of the present invention, there is provided a photosensitive material processing apparatus which exposes an image on a negative film onto a photographic paper, comprising: a base member to which a plurality of positioning means is mounted, said plurality of positioning means comprising a first positioning means, a second positioning means and a third positioning means, of which respective positions are controlled with respect to each other; a negative table mounted to said base member via said first positioning means so as to be positioned with respect to said base member and supporting the negative film; at least one optical system supporting member mounted to said base member via said second positioning means so as to be positioned with respect to said base member and supporting optical system components which guide an exposure light beam for exposing the image on the negative film; and a guide member for a photographic paper, which is mounted to said base member via said third positioning means so as to be positioned with respect to said base member and guides the photographic paper during an exposure process.

According to a second aspect of the present invention, there is provided a photosensitive material processing apparatus which exposes an image on a negative film onto an elongated photographic paper and simultaneously develops, dries and cuts the photographic paper in that order, comprising: a base member; a conveying member which conveys the photographic paper and which is positioned with respect to said base member via at least one first positioning member mounted to said base member; a development portion which develops an exposed photographic paper and which is positioned with respect to said conveying member via at least one second positioning member mounted to said conveying member; a drying portion which dries the developed photographic paper and which is positioned with respect to said development portion via at least one third positioning member mounted to said development portion; and a cutting portion which cuts the elongated photographic paper and which is positioned with respect to said drying portion via at least one fourth positioning member mounted to said drying portion.

According to the first aspect of the present invention as constructed above, a plurality of positioning means, of which respective positions are controlled with respect to each other, is mounted to the base member. The negative table supporting the negative film is mounted to the base member via the first positioning means, and the optical system supports member, which supporting the optical system component by which an exposure light beam for exposing the image is guided, is mounted to the base member via the second positioning means. And further, the guide member for the photographic paper, which guides the photographic paper during an exposure process, is mounted to the base member via the third positioning means.

Accordingly, when an image on the negative film is exposed onto the photographic paper, the negative film, the optical system components such as a lens and a mirror, and the photographic paper are respectively disposed such that each position is controlled, and the positioning accuracy between these members is enhanced.

According to the second aspect of the present invention as constructed above, the conveying member for conveying the photographic paper is mounted to the base member via at least one positioning member for position-controlling, and the conveying member is positioned with respect to the base member. The development portion for developing the exposed photographic paper is mounted and positioned with respect to the conveying member via at least one positioning member mounted to the conveying member. The drying portion for drying the developed photographic paper is mounted and positioned with respect to the development portion via at least one positioning member mounted to the development portion. The cutting portion for cutting the elongated photographic paper is mounted and positioned with respect to the drying portion via at least one positioning member mounted to the drying portion.

Accordingly, when the image on the negative film is exposed to the elongated photographic paper, and simultaneously, the photographic paper is developed, dried, and cut in that order, the base member, the conveying member, the development portion, the drying portion and the cutting portion are sequentially positioned by means of the respective positioning members which connect these members to each other, and the elongated photographic paper can be properly conveyed.

As described above, the photosensitive material processing apparatus according to the present invention has the excellent effects of being capable of positioning, with high accuracy, each member of the apparatus with respect to each other when the respective members are mounted to the apparatus, so as to maintain the quality of an image and simultaneously to reliably convey the photographic paper.

DESCRIPTION OF THE PREFERRED EMBODIMENTS

Referring now to FIG. 1 through FIG. 14, a first embodiment of a photosensitive material processing apparatus according to the present invention will be described below.

Figure 1:
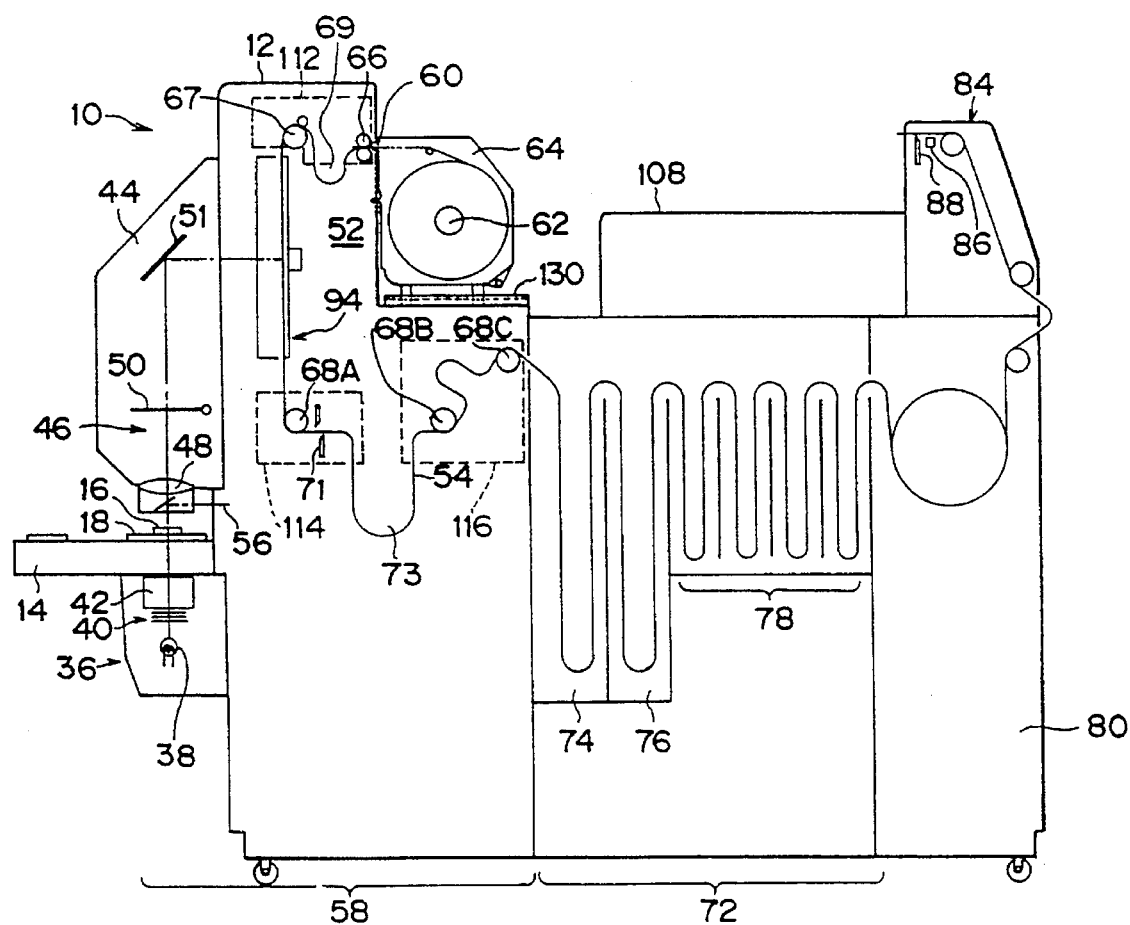
FIG. 1 is a schematic diagram illustrating a printer-processor to which a first embodiment of the present invention is applied.

FIG. 1 illustrates a printer-processor 10, to which the present embodiment is applied. First, an overall structure of the printer-processor 10 will be described.

The printer-processor 10 is externally covered with a casing 12. A work table 14 projects from the casing 12 toward the left side in FIG. 1. A negative carrier 18 in which a negative film 18 is set is mounted to the upper surface of the working table 14. Further, a light source portion 36 is disposed under the working table 14. The light source portion 38 has a light source 38. A light beam emitted from the light source 38 passes through a filter portion 40 and a diffusion cylinder 42, so as to reach the negative film 16 set on the negative carrier 18. The filter portion 40 comprises three filters, cyan (C), magenta (M), and yellow (Y). Each filter is adapted so as to move into or out of the optical axis of the light beam.

An arm 44 disposed above the working table 14 is provided with an optical system 46. The optical system 46 comprises a lens 48, a shutter 50 and a reflecting mirror 51. The lens 48 and the shutter 50 are disposed in the optical axis of the light beam. The light beam transmitted through the negative film 16 passes through the lens 48 and the shutter 50 and is deflected by the reflecting mirror 51 at an angle of substantially 90°, so that an image on the negative film 16 is directed onto-a photographic paper 54 set in an exposure chamber 52.

Further, the optical system 46 is provided with a densitometer 56 such as a CCD for measuring the density of the negative film 16. The densitometer 56 is connected to an unillustrated controller. Based upon data measured by the densitometer 56 and data inputted from keys by an operator, an exposure correction value during exposure is determined.

An exposure portion 58 comprises the light source portion 36, the optical system 46, and the exposure chamber 52, so as to perform a printing process.

A magazine-mounting portion 60 is disposed at a corner portion of an upper right-hand portion of the exposure chamber 52. A paper magazine 64 accommodating an elongated photographic paper 54 wound round a reel 62 in layer form is mounted to the magazine-mounting portion 60.

A pair of conveying rollers 66 is disposed in the vicinity of the magazine-mounting portion 60 and holds the photographic paper 54 therebetween so as to convey the photographic paper 54 horizontally to the exposure chamber 52. The photographic paper 54 is wound around a roller 67 in front of the arm 44 so that the direction thereof is changed by 90° so as to be oriented downward. It should be noted that, between the rollers 66 and the roller 67, a first stock portion 69 is disposed which guides and stocks the photographic paper in a substantially U-shaped configuration.

At a downstream side of the direction of guiding the photographic paper 54 by the roller 67, an exposure stage 94 is disposed. The exposure stage 94 is provided with a variable mask (not shown) which is connected to an unillustrated controller so as to be opened or closed. For this reason, the controller causes the variable mask to be changed in dimensions of length and width of a mask portion in accordance with the size and the kind of print, e.g., the existence of a white frame.

Rollers 68A, 68B and 68C are disposed under an exposure position of the exposure chamber 52. Within the exposure chamber 52, the photographic paper 54 onto which an image of the negative film 16 is printed changes direction by substantially 90° and is conveyed to a color development portion 74 of a processor portion 72 adjacent to the exposure chamber 52.

At a downstream side of the roller 68A, a cutter 71 is disposed. The cutter 71 is used for cutting a trailing end of the photographic paper 54 after an exposing process has been finished, thereby allowing the remaining portion of the photographic paper 54 in the exposure chamber 52 to be re-wound by the paper magazine 64.

Meanwhile, a second stock portion 78 which guides and stocks the printed photographic paper 54 in a substantially U-shaped configuration is disposed between the roller 68A and the roller 68B. The second stock portion 73 cancels the difference in operating time between the exposure portion 58 which stocks and prints the photographic paper 54, and the processor portion 7Z which performs the processes of development, fixation and washing in water.

The color development portion 74 develops the photographic paper 54 by immersing the photographic paper 54 in developer. The developed photographic paper 54 is conveyed to a bleach-fix portion 76 adjacent to the color development portion 74. The photographic paper.54 is immersed in fixer for fixation in the bleach-fix portion 76. The fixed photographic paper 54 is carried to a rinse portion 78 adjacent to the bleach-fix portion 76. The photographic paper 54 is immersed in washing water in the rinse portion 78 for washing in water.

The washed photographic paper 54 is conveyed to a drying portion 80 adjacent to the rinse portion 78. The drying portion 80 winds the photographic paper 54 around a roller so as to be exposed to hot-air for drying. The dried photographic paper 54 is nipped by an unillustrated pair of rollers and is removed from the drying portion 80. A cutter portion 84 is disposed downstream from the drying portion 80. The cutter portion 84 comprises a cut mark sensor 86 for detecting a cut mark provided on the photographic paper 54, and a cutter 88 for cutting the photographic paper 54. The cutter portion 84 cuts the photographic paper 54 at every image frame, and ejects the image frames out of the casing 12 of the printer-processor 10.

The cut portions of the photographic paper 54 are then sorted by a sorter portion 108.

Figure 2:
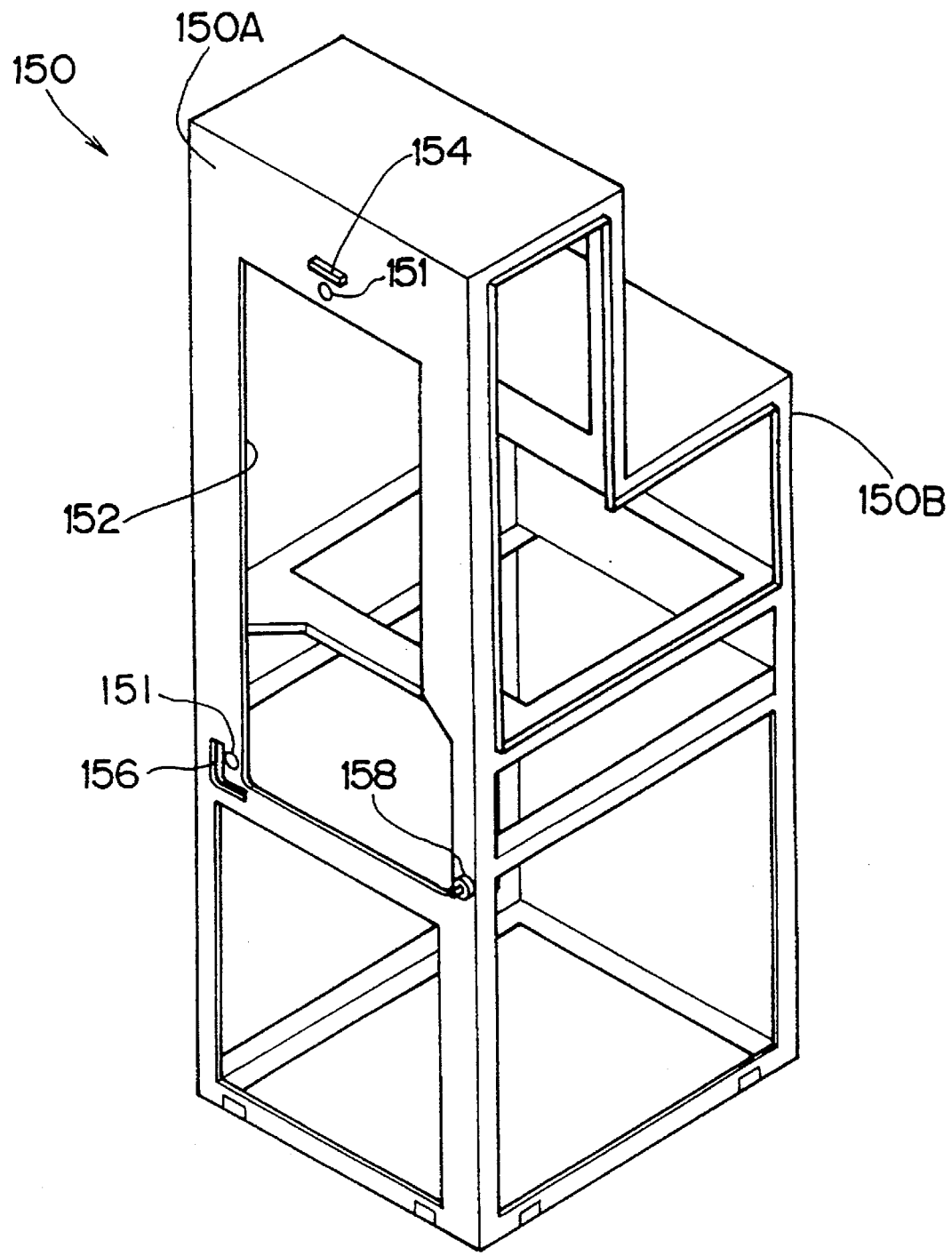
FIG. 2 is a perspective view of a frame according to the first embodiment of the present invention.

Meanwhile, within the casing 12, a frame 150 is provided as shown in FIG. 2, which forms the structure of the printer-processor 10.

As illustrated in FIG. 2, the frame 150 has a substantially L-shaped configuration when seen from a side surface thereof and has a rectangular shape with a vertical direction thereof being made longer when seen from a front side. The frame 150 is constructed such that the conveying rollers 66, 67 and the like are mounted in an internal cavity of the frame 150.

Figure 3:
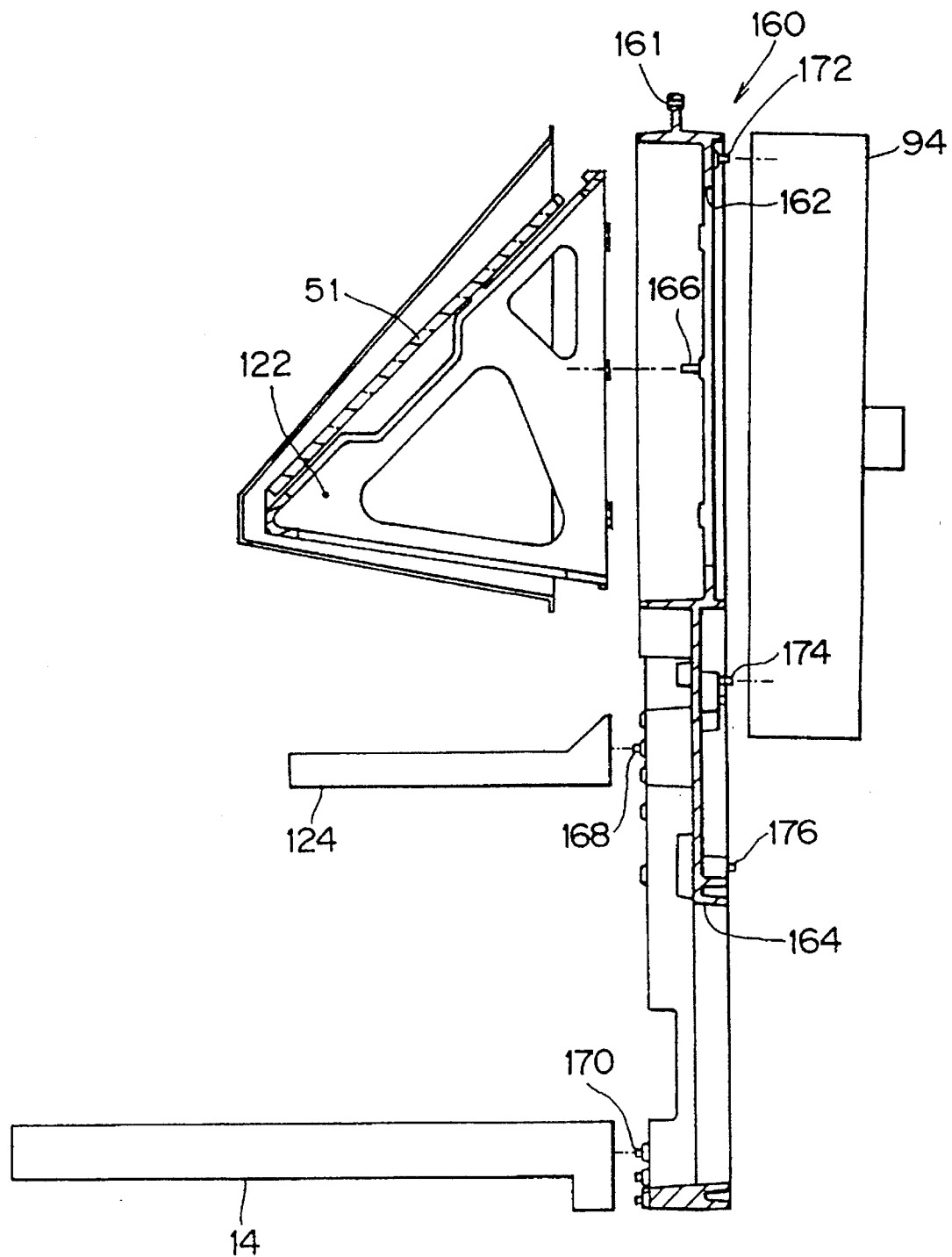
FIG. 3 is a sectional view of a base member according to the first embodiment of the present invention.
Figure 4:
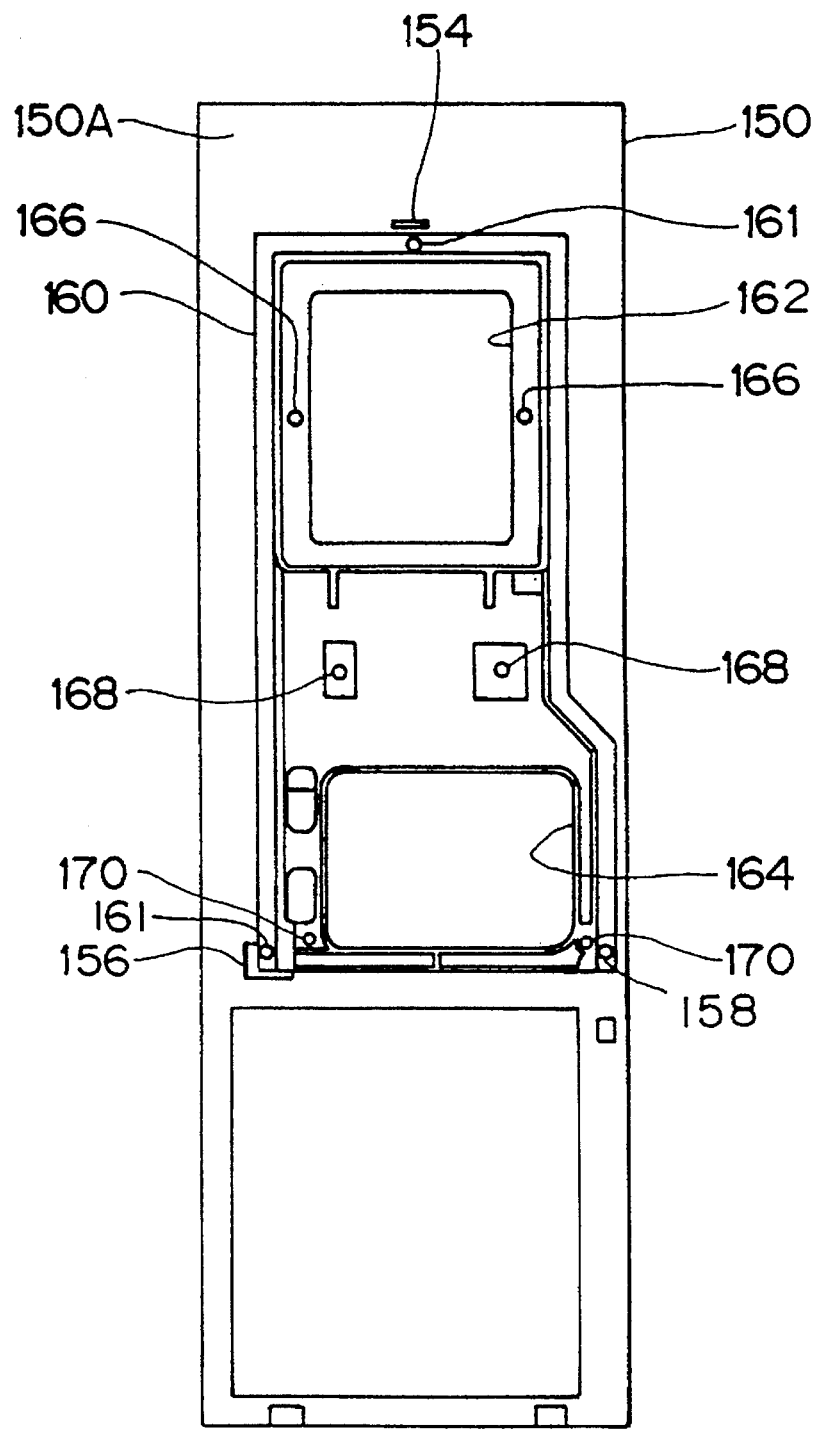
FIG. 4 is a front view of the base member according to the first embodiment of the present invention, illustrating a state in which the base member is mounted to the frame.

At a front side 150A of the frame 150, an opening portion 152 (see FIG. 1) is formed such that a base member 160 which is made of for example aluminum alloy so as to be formed into a substantially rectangular shape by molding or the like, as illustrated in FIG. 3 and FIG. 4, is inserted into and mounted to the opening portion 152. Guide pieces 154, 156, 158, which respectively guide and mount a base member 160, project from an upper portion, a right-hand lower portion and a left-hand lower portion of the opening portion 152. A plurality of threaded holes 151 is formed in the frame 150. Further, the guide piece 158 also has a threaded hole formed therein, and the base member 160 has hole portions 161 corresponding to the threaded holes 151 and 158. When a bolt (not shown) is screwed into each of the threaded holes 151 and 158 via the hole portions 161, the base member 160 is fixed to the frame 150.

A pair of opening portions 162, 164 are formed in the base member 160 so as to be respectively disposed at upper and lower portions of the base member 160. An exposure light beam passes through the opening portion 162. Further, each pair of guide pins 166, 168, 170 (the respective front-side pins of these pairs of guide pins which can be seen in FIG. 3 are indicated) is disposed and embedded in the base member 160 at the left-side surface thereof in FIG. 3 from an upper portion to a lower portion of the base member. These guide pins are disposed such that the mutual positional relationship thereof is accurately controlled. Each guide pin 166 is engaged with a hole portion (not shown) which is formed in a mirror-supporting table 122 for supporting the reflecting mirror 51 as an optical system component and corresponds to one of the guide pins 166. In addition, each guide pin 168 is engaged with a hole portion (not shown) which is formed in a lens table 124 on which the lens 48 as an optical system component is mounted and corresponds to one of the guide pins 168. Each guide pin 170 is engaged with a hole portion (not shown) which is formed in the working table 14 on which the negative film 16 is mounted and corresponds to one of the guide pins 170.

Meanwhile, each pair of guide pins 172, 174, 176 (the respective front-side pins of these pairs of guide pins 172, 174, 176 which can be seen in FIG. 3 are indicated) is respectively disposed and embedded in the base member 160 at the upper, middle and lower portions thereof on the right-side surface of the base member 160 in FIG. 3. Each pair of guide pins 172, 174, 176 is disposed such that the positional relationship of these guide pins 172, 174, 176 with respect to the left-side guide pins 166, 168, 170 and the mutual positional relationship of the guide pins 172, 174, 176 are accurately controlled. Each pair of guide pins 172, 174, 176 are adapted so as to extend toward an inner side of the frame 150 when the base member 160 is inserted into and mounted to the frame 150.

Among these pairs of guide pins 172, 174, and 176 extending toward an inner side of the frame 150, the guide pins 172 and 174 are engaged with hole portions (not shown) which are formed on the exposure stage 94 serving as a guide member for a photographic paper and corresponding to the guide pins 172 and 174, respectively. As a result, the exposure stage 94 is accurately positioned via the base member 160 with respect to the working table 14 serving as a negative table, a lens table 124 serving as an optical system supporting member, and a mirror supporting table 122.

Accordingly, it is possible not only to arrange the reflecting mirror 51, the lens 48 and the negative film 16 on a straight line so that these members are in a state of not being inclined toward each other, but also to position the exposure stage 94 so that it is of not offset and inclined with respect to an optical axis from these members.

The guide pins 170 serve as first guide pins, the guide pins 166, 168 serve as second guide pins, and the guide pins 172, 174 serve as third guide pins.

Figure 5:
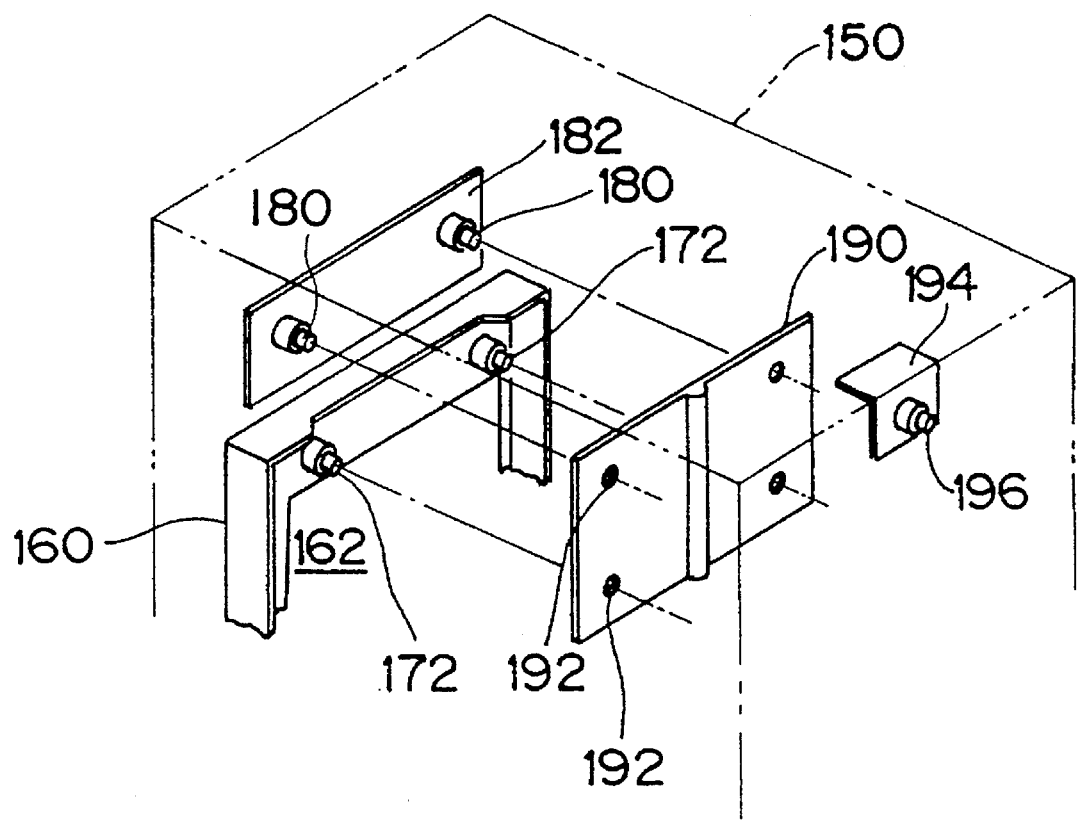
FIG. 5 is a perspective view of the base member according to the first embodiment of the present invention, illustrating a positional relationship between the base member and guide pins.

At an upper portion of the frame 150 before the exposure stage 94 is mounted to the frame 150, a guide plate 182 from which guide pins 180 project is fixed to the frame 150 by means of a screw or the like, such that the positional relationship between the guide plate 182 and the guide pins 172 is controlled by a jig 190 in which each pair of hole portions 192 is respectively formed at upper and lower portions thereof (see FIG. 5). In other words, lower hole portions 192 of the jig 190 are engaged with the guide pins 172, and simultaneously, upper hole portions 192 are engaged with the guide pins 180, so that the positions of the guide pins 180 with respect to the guide pins 172 are controlled.

Figure 6:
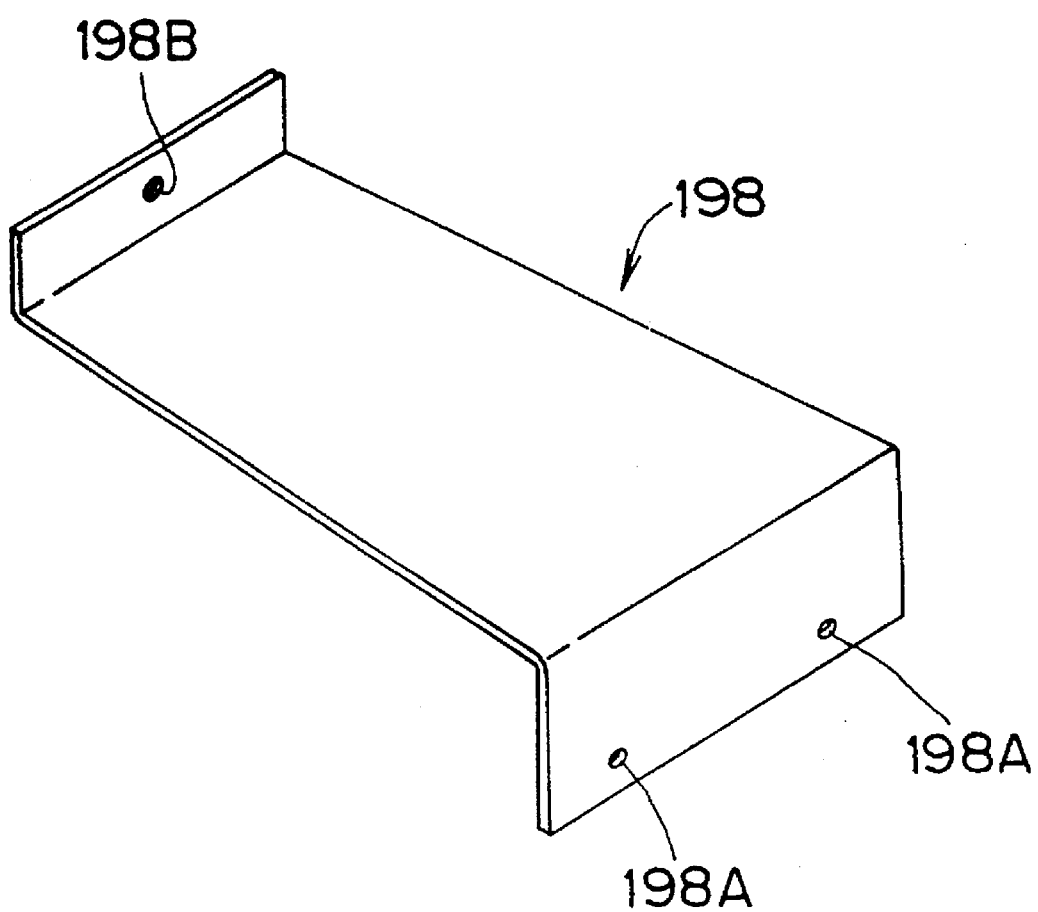
FIG. 6 is a perspective view of a jig used in the first embodiment of the present invention.
Figure 7:
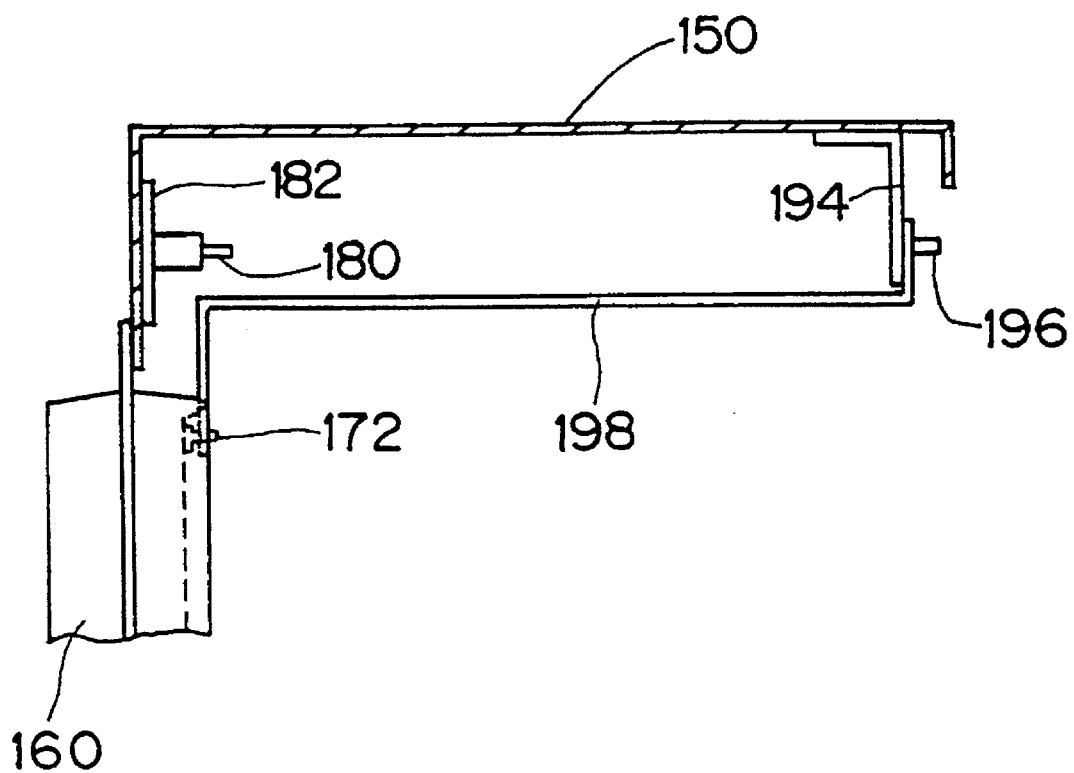
FIG. 7 is a side view of the base member according to the first embodiment of the present invention, illustrating a positional relationship between the base member and guide pins.

Further, the guide pin 195 is mounted via an L-shaped bracket 194 to the frame 150 by means of a screw or the like. However, as illustrated in FIG. 6, a jig 198 having a base end portion and a leading end portion both of which are bent with hole portions 198A, 198B formed therein, is used, so that the positional relationship between the guide pin 180 and the guide pin 196 can be accurately controlled (see FIG. 7). Namely, the hole portions 198A formed at the base end portion of the jig 198 engage the guide pins 172 formed in the base member 160, respectively, and simultaneously, the guide pin 196 is inserted into the hole portion 198B formed at the leading end portion of the jig 198, so that the guide pin 196 can be positioned with respect to the base member 160.

For this reason, between these guide pins 180 and 196, a supply portion 112 which comprises rollers 66, 67, and the like (see FIG. 1) is accurately positioned with respect to the base member 160, such that the position of the supply portion 112 is controlled by the guide pins 180 and 196. Then, a magazine table 130 is mounted by means of an unillustrated jig based on the guide pin 196, and the height of the magazine table 130 (see FIG. 1) at a top surface thereof can be suitably determined with respect to the supply portion 112.

Figure 8:
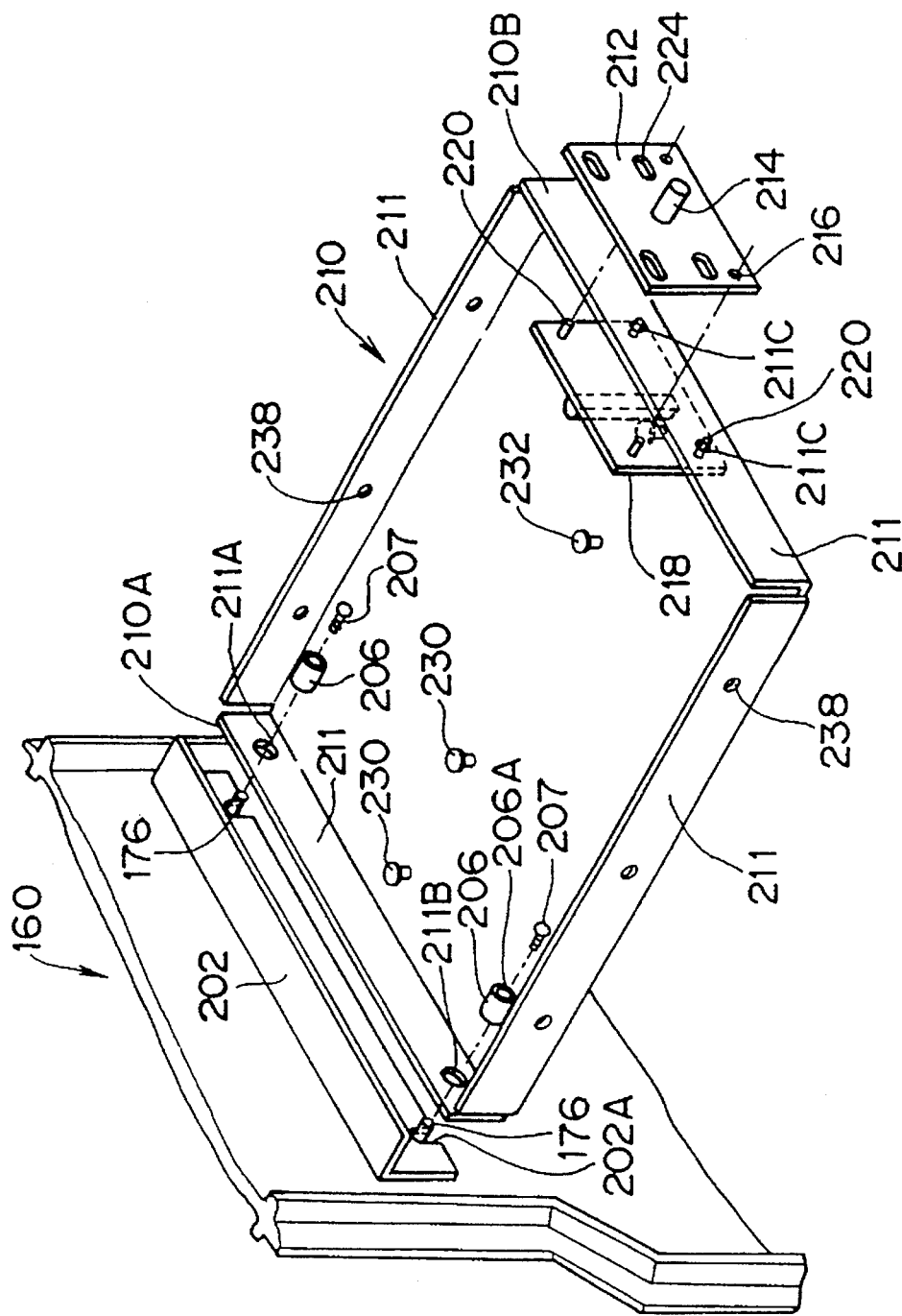
FIG. 8 is an exploded perspective view of the base member and a conveying base according to the first embodiment of the present invention.

Further, a bracket 202 is positioned at the base member 160 in the following manner: as illustrated in FIG. 8, a pair of guide pins 176 extends from a lower portion of the base member 160 and holds the bracket 202 having recessed portions 202A which correspond to the pair of guide pins 176, respectively, and further, cap pins 206, of which each outer diameter is larger than that of the guide pin 176 and which have each hole portion (not shown) with which the guide pin 176 is tightly engaged, are respectively mounted to the guide pins 176 by screwing a bolt 207. As a result, positioning of the bracket 202 with respect to the base member 160 can be performed in a state in which the bracket 202 is disposed between the base member 160 and the cap pin 206. It should be noted that the guide pin 176 has a threaded hole (not shown) at a leading end thereof, and the cap pin 206 has a hole portion 206A corresponding to the threaded hole of the guide pin 176.

Further, a conveying base 210 is formed into a rectangular shape and has a right-angled bent portion 211 on each side of the base. The bent portion 211 located at a base end 210A of the conveying base 210 is provided with a round hole 211A and an oblong hole glib formed therein. The cap pins 206 engage the round hole 211A and the oblong hole 211B, respectively, so that the base end 210A of the conveying base 210 is mounted to the base member 160.

At another side end 210B of the conveying base 210, a guide pin 214 is mounted to a back face 150B of the frame 150, (see FIG. 9) such that the position of the guide pin 214 is accurately controlled by a jig 218 with respect to hole portions 211C formed in the conveying base 210.

Figure 9:
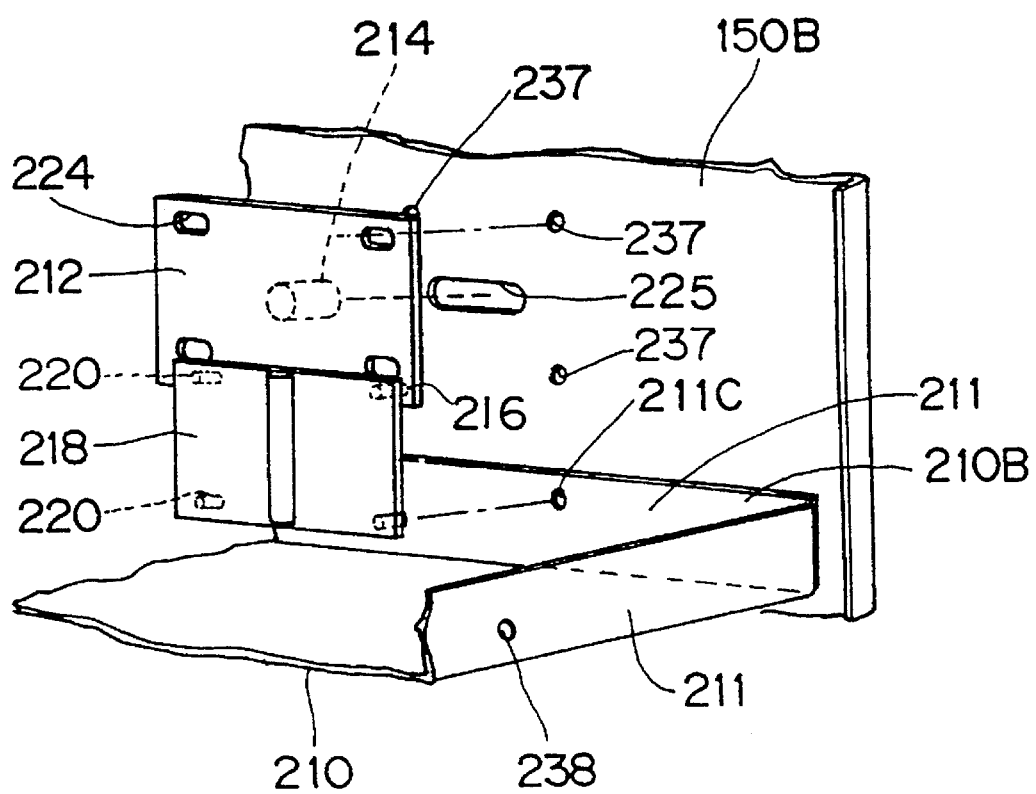
FIG. 9 is a perspective view of the conveying base according to the first embodiment of the present invention, illustrating a positioning of the conveying base in the vicinity of a leading end of the conveying base.
Figure 10:
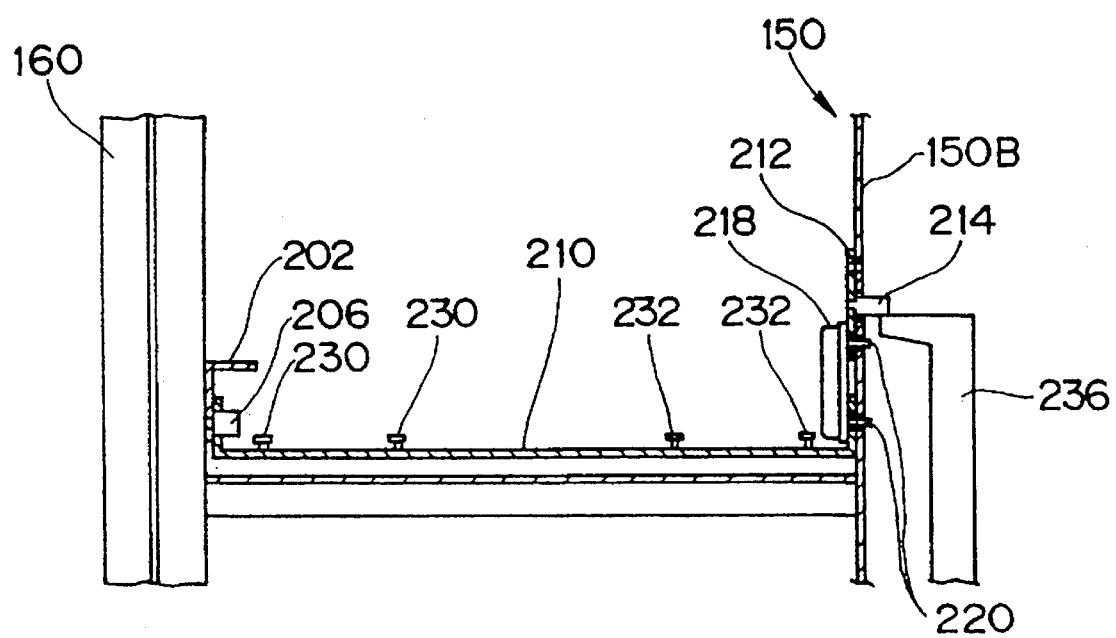
FIG. 10 is a sectional view, when seen from a side surface of the base member and the conveying base according to the first embodiment of the present invention, of a portion in the periphery of the base member and the conveying base.

A jig 218 having each pair of pins 220 respectively at upper and lower portions thereof, is mounted to a rectangular plate 212 which is constructed such that the guide pin 214 for connection with the processor portion 72 is embedded in the center of the plate 212 and a pair of round holes 216 are formed at a lower portion thereof (see FIGS. 8 and 9). Then, the guide pin 214 is inserted into an oblong hole 225 which is formed at the back face 150B of the frame 150 such that the guide pin 214 is loosely engaged with the oblong hole 225. And simultaneously, the lower pins 220 of the jig 218 are respectively inserted into the hole portions 211C of the conveying base 210. Further, as illustrated in FIG. 10, a jig 236 for positioning the frame 150 from the bottom surface of the frame 150 is brought into contact with a lower side of the guide pin 214, and the position of the guide pin 214 and the vertically-directional position of the leading end of the conveying base 210 which connects the guide pin 214 via the jig 236 are respectively determined. In this state, an unillustrated bolt is inserted into each oblong hole 224 and each threaded hole 237 formed at the back fact 150B so as to screw the plate 212 to the frame 150. And simultaneously, the conveying base 210 is screwed to the frame 150 by means of the threaded holes 238 formed in the bent portions 211 of the conveying base 210. After that, the bracket 202, the cap pin 206, the jigs 218, 236, and the like are removed from the frame 150.

Further, as illustrated in FIGS. 8 and 10, a pair of guide pins 230 are embedded in the upper surface of the conveying base 210 at a proximal base end of the conveying base 210, while a pair of guide pins 232 are embedded therein at a proximal leading end of the conveying base 210. Accordingly, each pair of guide pins 230, 232 are respectively positioned with respect to the base member 160 via the conveying base 210, the cap pins 206, the guide pins 176 and the like. The pair of guide pins 230 are respectively adapted so as to engage a recess (not shown) formed in a main drive portion 114 comprised of a roller 68A. The pair of guide pins 232 are respectively adapted so as to engage a recess (not shown) formed in a delivery portion 116 comprised of rollers 68B, 68C and the like.

From the foregoing, the supply portion 112 serving as a member for conveying, the conveying base 210, the main drive portion 114, the delivery portion 116, and the like are accurately positioned with respect to the base member 160 by means of the guide pins 172, 176, 230, 232, and the like.

A hole portion (not shown) formed in the processor portion 72 is engaged with the guide pin 214 mounted to the plate 212, so that the position of the processor portion 72 in a vertical direction and a transverse direction of the processor portion 72 is controlled with respect to the exposure portion 58.

Figure 11:
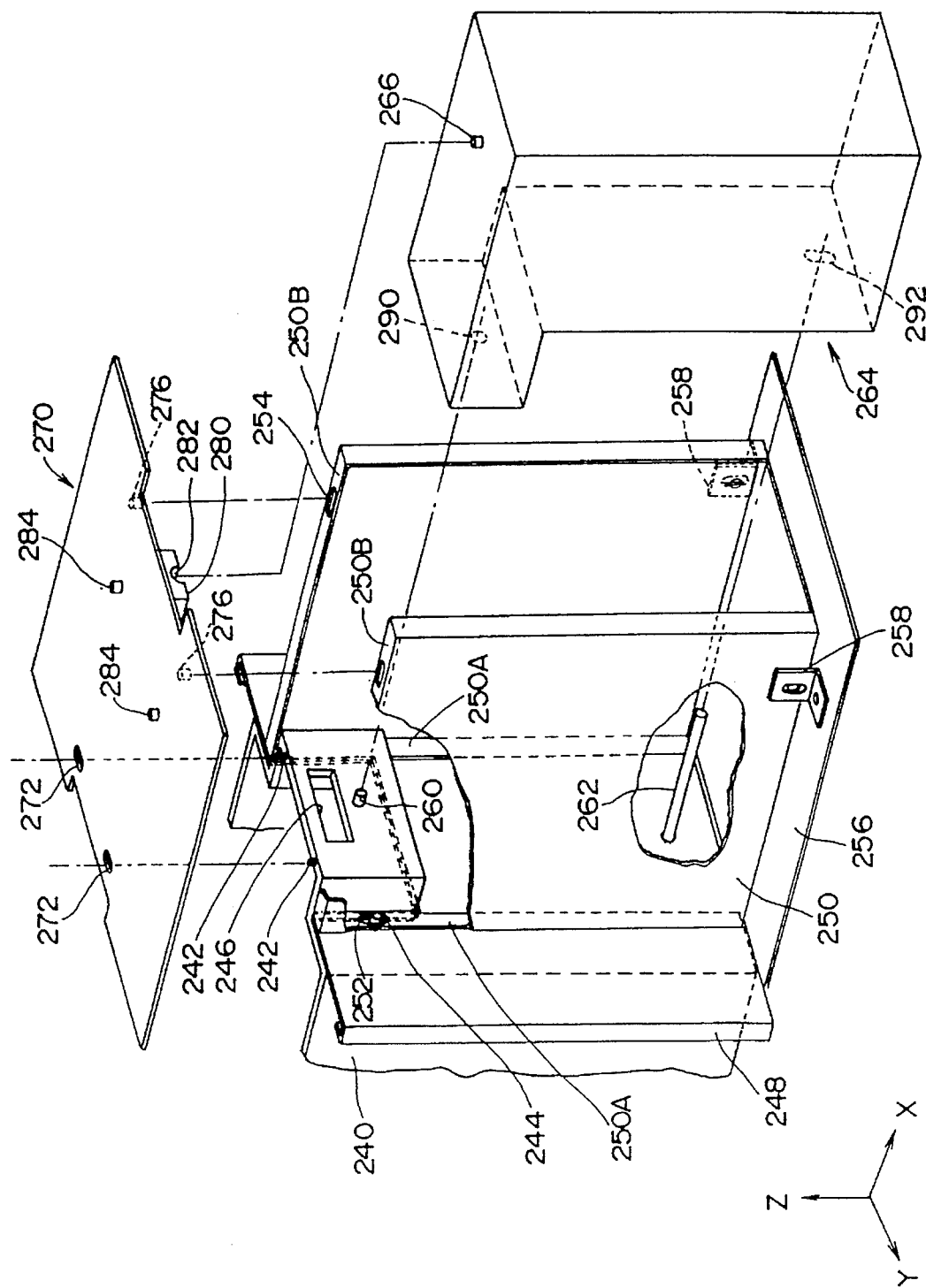
FIG. 11 is a perspective sectional view of a portion in the periphery of a drying portion according to the first embodiment of the present invention.
Figure 12:
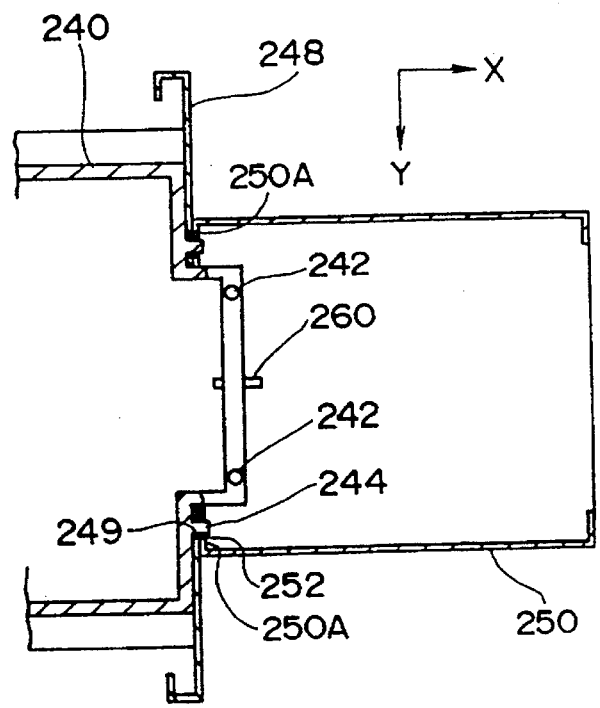
FIG. 12 is a sectional plan view of a portion in the periphery of the drying portion according to the first embodiment of the present invention.
Figure 13:
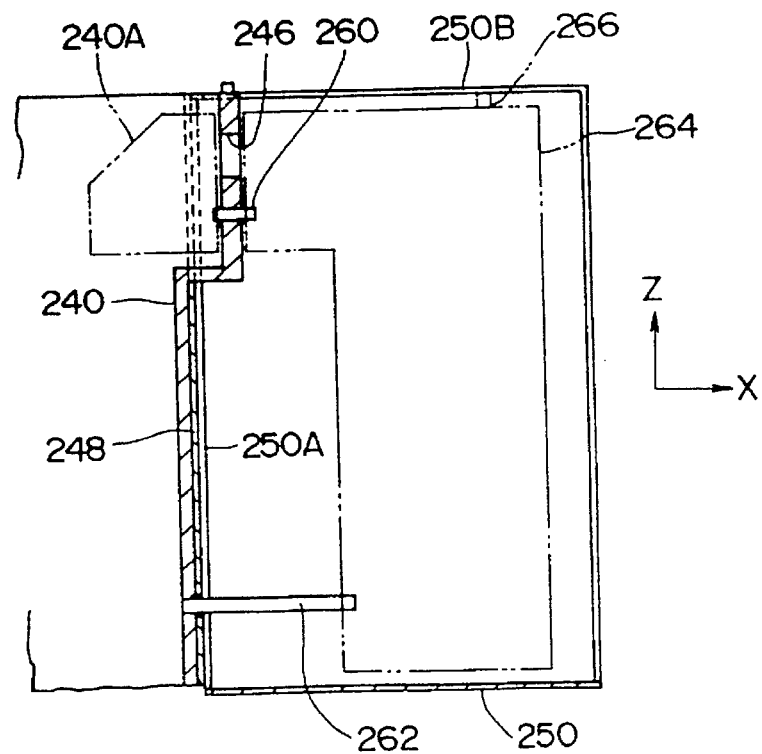
FIG. 13 is a side view of a drying rack according to the first embodiment of the present invention, illustrating a state in which the drying rack is mounted.
Figure 14:
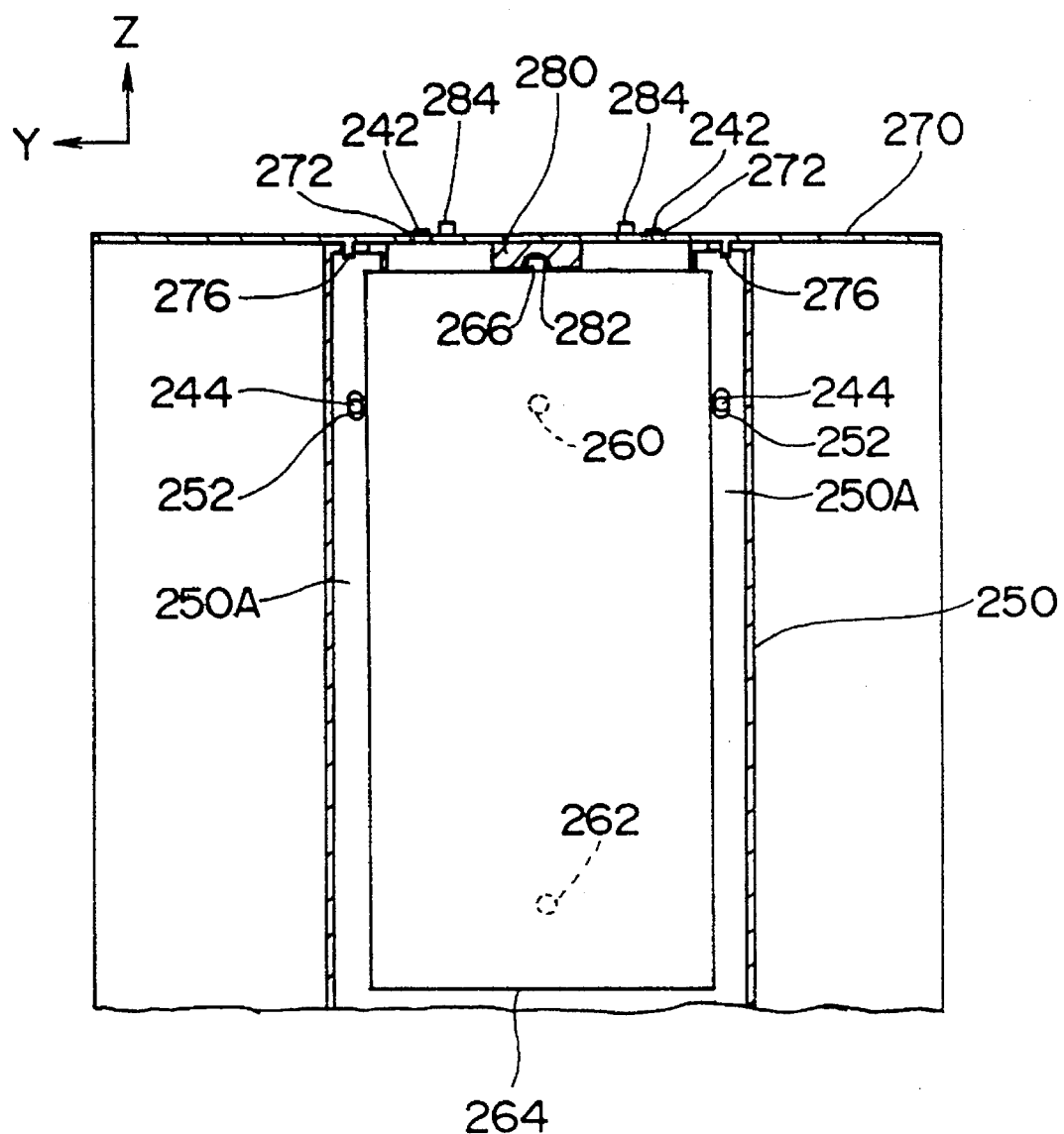
FIG. 14 is a back view of the drying rack according to the first embodiment of the present invention, illustrating a positional relationship between the drying rack and a top plate.

Meanwhile, as illustrated in FIG. 11 through FIG. 14, a pair of guide pins 242 extending upward are fixed to an upper surface of a rack-receiving portion 240 which forms an outside frame of the processor portion 72 serving as a development portion and accommodates a processing tank inside. Further, an opening portion 246 through which the photographic paper 54 passes is formed at a rear end surface of the rack-receiving portion 240, and a pair of guide pins 244 are fixed so as to extend in the left-to-right direction, i.e., in the direction of Y-axis. The pair of guide pins 244 engages a pair of hole portions 249, respectively, which are formed in the frame plate 248 as illustrated in FIG. 12, thereby causing the positional relationship in the direction of the Y-axis between the rack-receiving portion 240 and the frame plate 248 to be controlled.

Further, a leading end of the guide pin 244 passing through the frame plate 248 engages one of a pair of oblong holes 252 formed in a front-side bent piece 250A of a drying box 250 which serves as an outside frame of the drying portion 80 for drying the photographic paper. Next, in the case of mounting the drying box 250, the drying box 250 is fixed to the base table 256 by screwing an L-shaped metallic fixture 258, so that the position of the drying box 250 in a vertical direction, i.e., the direction of the Z-axis, is controlled.

An upper-side bent piece 250B is formed at an upper portion of the drying box 250. An oblong hole 254 of which the longitudinal direction is parallel to the front-to-back direction of the printer-processor 10, i.e., the direction of the X-axis, is formed in the upper-side bent piece 250B. The guide pin 260 is mounted to the rack-receiving portion 240 so that one end of the guide pin 260 extends in the front-to-back direction of the printer-processor 10. The guide pin 260 is used to engage a squeeze rack 240A (see FIG. 18) for squeezing off water which has adhered to the photographic paper 54. A guide pin 262 which is longer than the guide pin 260 and is positioned just under the guide pin 260 is mounted to the frame plate 248 so as to extend in the front-to-back direction of the printer-processor 10.

A drying rack 264 having a conveying roller, a guide, a drier and the like (none of is shown) inside which are mounted to the drying box 250. In this case, as illustrated in FIG. 11, the guide pins 260 and 262 are respectively inserted into a round hole 290 and an oblong hole 292 both of which are formed in the drying rack 264, so that the position of the drying rack 264 in a vertical direction and a left-to-right direction is controlled with respect to the rack-receiving portion 240.

Further, a guide pin 266 extending in a vertical direction is fixed to an upper surface of the drying rack 264. An engaged member 280 having a U-shaped groove 282 which corresponds to the guide pin 266 is mounted to a bottom surface of a top plate 270. The U-shaped groove 282 which is integral with the top plate 270 is engaged with the guide pin 266, so as to cover the drying rack 264 at an upper side thereof. A pair of oblong holes 272 each corresponding to the guide pins 242 is formed in the top plate 270, and, a pair of guide pins 276 are formed so as to correspond to the pair of oblong holes 254. Accordingly, when the top plate 270 is mounted on the drying rack 264, the guide pin 266 engages the U-shaped groove 282 and the oblong holes 254 engages the guide pins 276, so that the position of the top plate 270 in the left-to-right direction is controlled. Further, when the guide pins 242 engage the oblong holes 272, the position of the top plate 270 in the front-to-back direction is controlled.

On the upper surface of the top plate 270, a pair of guide pins 284 extending in a vertical direction engage hole portions (not shown) formed in a cutter portion 84 for cutting the photographic paper, and the pins 284 control the position of the cutter portion 84 with respect to the top plate 270. For this reason, when the cutter portion 84 is mounted on and fixed to the top plate 270, the cutter portion 84 can be accurately positioned with respect to the rack-receiving portion 240 via these guide pins 266, 242, 276, oblong holes 272, 254, the U-shaped groove 282 and the like.

As explained above, the conveying base 210, the processor portion 72, the drying rack 264, and the cutter portion 84, all of which are sequentially mounted to the base member 160, are positioned with high accuracy, and during conveying the photographic paper 54, a zigzag-line movement of the photographic paper 54, jamming of papers, and the like are prevented.

Next, the operation of the present embodiment will be described.

First, a normal printing procedure of the printer-processor 10 will be explained in the following.

The photographic paper 54 is previously carried to the exposure chamber 52 and then is positioned. When the printing process is started, the negative carrier 18 is driven to position the negative film 16, and the light source 38 is turned on. LATD (Large Area Transmittance Density) of the negative film 16 is measured by the densitometer 56. According to the measured data and the manual input data, the exposure correction is set and an exposure (exposure time) is calculated, whereby an optimal exposure condition can be provided. The respective filters C, M, and Y positioned on the optical axis are moved according to the exposure condition.

Next, the shutter 50 is opened. The opened shutter 50 allows a light beam emitted from the light source 38 to pass through the filter portion 40 and the negative film 16 into the exposure chamber 52. The printing process is started to print an image on the negative film 16 onto the photographic paper 54 positioned in the exposure chamber 52, and the shutter 50 is closed after the predetermined exposure time. Finally, a cut mark is provided on the photographic paper 54 and one image frame of the negative film 16 is conveyed. In the operation described above, one image frame of the negative film 16 has been completely printed. The above operation is repeated to move the photographic paper 54 so as to carry printed portions thereof to the processor portion 72 in order.

The photographic paper 54 which is conveyed to the processor portion 72 is further conveyed to the color development portion 74 wherein the photographic paper 54 is immersed in developer for development. The developed photographic paper 54 is then conveyed to a bleach-fix portion 76 for fixing. Thereafter, the fixed photographic paper 54 is conveyed to the rinse portion 78 so as to be washed in water. Having been washed with water, the photographic paper 54 is conveyed to the drying portion 80 for a drying process.

A cut mark is detected on the dried photographic paper 54 in the cutter portion 84 so that the photographic paper 54 is cut at each image frame and then is sorted by the sorter portion 108.

Prior to the aforementioned process, an operator places the paper magazine 64, wherein the photographic paper 54 is accommodated, on the magazine table 130 so that the paper magazine 64 is mounted at a predetermined position. Then, the elongated photographic paper 54 is sequentially conveyed from the paper magazine 64 into the printer-processor 10.

Further, during the aforementioned process, respective positions of the following members are controlled.

Namely, the working table 14 for supporting the negative film 16 engages the guide pins 170. The lens 48, through which an exposure light beam for exposing an image on the negative film 16 passes, is supported by the lens table 134, and the lens table 124 and the mirror-supporting table 122 for supporting the reflecting mirror 51 engage the guide pins 166, 168, respectively. The exposure stage 94 which guides the photographic paper 54 during exposure engages the guide pins 172, 174. In this manner, the aforementioned members are respectively mounted to the base member 160.

Accordingly, when an image on the negative film 16 is exposed to the photographic paper 54, each position of the negative film 16, the lens 48, the reflecting mirror 51 and the photographic paper 54 is controlled via a plurality of guide pins 166, 168, 170, 172, 174 projecting from the base member 160. As a result, positioning accuracy of these members improves and an image of the negative film 16 can be properly exposed onto the photographic paper 54.

Meanwhile, the supply portion 112 for conveying the photographic paper 54 engages the guide pins 180, 196 which gives positioning accuracy based on the guide pins 172 which project from the base member 160 so as to effect position-controlling. Further, the conveying base 210, which is engaged with the guide pins 176 such that the position of the conveying base 210 is controlled, is mounted to the base member 160, and the main drive portion 114 and the delivery portion 116 both of which convey the photographic paper 54 are mounted to the base member 160 via each pair of guide pins 230 and 232, respectively.

The processor portion 72 in which the exposed photographic paper 54 is developed engages the guide pin 214 projecting from and positioned by the conveying base 210, so that the processor portion 72 is mounted to the conveying base 210. The drying rack 264 which comprises the drying portion 80 for drying the developed photographic paper 54 engages the guide pins 260, 262 projecting from the rack-receiving portion 240 which forms the processor portion 72, so that the drying portion 80 is mounted to the processor portion 72. The cutter portion 84 for cutting the elongated photographic paper 54 is engaged, via the top plate 270, with the guide pin 266 projecting from the drying rack 264, so that the cutter portion 84 is mounted to the drying portion 80.

Accordingly, when an image on the negative film 16 is exposed onto the elongated photographic paper 54, and simultaneously, the photographic paper 54 is developed, dried and cut in sequence, the base member 160, the conveying base 210, the supply portion 112, the main drive portion 114, the delivery portion 116, the processor portion 72, the drying portion 80 and the cutter portion 84 are sequentially positioned by means of the guide pins 170, 172, 174, 176, 180, 196, 214, 230, 232, 260, 262, 266 and the like, which respectively connect the aforementioned members. This results in the positional relationship between these members being set with high accuracy and the elongated photographic paper 54 being properly carried.

As a result, at the time of assembling the printer-processor 10, or when cleaning the inside of the printer-processor 10, it is possible to mount each member to each other only by engaging guide pins with hole portions. Accordingly, these members can be positioned with high accuracy, and simultaneously, these members can be easily mounted to each other.

Meanwhile, when the guide pins 166, 168, 170, 172, 174, 176 or the like are embedded in the base member 160, hole portions, which are positioned with high accuracy, are previously formed by a machine tool such as a milling machine, and the guide pins are driven into these hole portions. This improves the mutual positioning accuracy of the guide pins.

What is claimed is:

1. A photosensitive material processing apparatus which exposes an image on a negative film onto a photographic paper, comprising:

a base member having a plurality of positioning means, said plurality of positioning means comprising first, second and third guide pins;

a negative table mounted to said base member via said first guide pin so as to be positioned relative to said base member, for supporting the negative film;

at least one optical system supporting member mounted to said base member via said second guide pin so as to be positioned relative to said base member, for supporting optical system components which guide an exposure light beam for exposing the image on the negative film; and a guide member mounted to said base member via said third guide pin so as to be positioned relative to said base member, for guiding the photographic paper during an exposure process.

2. A photosensitive material processing apparatus according to claim 1, further comprising:

a photographic paper-supplying portion which supplies the photographic paper and which is mounted to said base member via said third positioning means so as to be positioned relative to said base member.

3. A photosensitive material processing apparatus according to claim 2, further comprising:

a magazine table accommodating the photographic paper which is wound in roll form.

4. A photosensitive material processing apparatus according to claim 1, further comprising:

a conveying portion-supporting member which supports a conveying portion for conveying the photographic paper and which is mounted to said base member via a fourth positioning means mounted to said base member so as to be positioned relative to said base member.

5. A photosensitive material processing apparatus according to claim 4, wherein said conveying portion-supporting member is provided with a fifth positioning means, and said conveying portion comprises a main drive portion for conveying the photographic paper, said main drive portion being mounted to said conveying portion-supporting member via said fifth positioning means and positioned relative to said conveying portion-supporting member.

6. A photosensitive material processing apparatus according to claim 4, wherein said conveying portion-supporting member is provided with a sixth positioning means, and said conveying portion comprises a delivery portion for sending out the photographic paper, said delivery portion being mounted to said conveying portion-supporting member via said sixth positioning means so as to be positioned relative to said conveying portion-supporting member.

7. A photosensitive material processing apparatus according to claim 4, further comprising:

a development portion which develops the photographic paper and which is mounted to said conveying portion-supporting member via a seventh positioning means mounted to said conveying portion-supporting member so as to be positioned relative to said conveying portion-supporting member.

8. A photosensitive material processing apparatus according to claim 7, further comprising:

a drying portion which dries the developed photographic paper and which is mounted to said development portion via an eighth positioning means mounted to said development portion so as to be positioned relative to said development portion.

9. A photosensitive material processing apparatus according to claim 8, further comprising:

a cutting portion which cuts the dried photographic paper and which is mounted to said drying portion via a ninth positioning means mounted to said drying portion so as to be positioned relative to said drying portion.

10. A photosensitive material processing apparatus which exposes an image on a negative film onto an elongated photographic paper and develops, dries, and cuts the photographic paper in that order, comprising:

a base member;

a conveying member which conveys the photographic paper and which is positioned relative to said base member via at least one first positioning member mounted to said base member;

a development portion which develops an exposed photographic paper and which is positioned relative to said conveying member via at least one second positioning member mounted to said conveying member;

a drying portion which dries a developed photographic paper and which is positioned relative to said development portion via at least one third positioning member mounted to said development portion; and a cutting portion which cuts an elongated photographic paper and which is positioned relative to said drying portion via at least one fourth positioning member mounted to said drying portion, wherein said first, second, third and fourth positioning members each comprise one or more guide pins.

11. A photosensitive material processing apparatus according to claim 10, wherein said conveying member is positioned relative to said base member via a conveying base which is connected to said base member via said at least one first positioning member.

12. A photosensitive material processing apparatus according to claim 11, wherein said conveying member comprises a main drive portion which conveys the photographic paper to be conveyed, and a delivery portion which sends out the photographic paper.

13. A photosensitive material processing apparatus according to claim 12, wherein said cutting portion is positioned relative to said development portion via at least one fifth positioning member mounted to at least one of said cutting portion and said development portion.

14. A photosensitive material processing apparatus according to claim 10, wherein said cutting portion is connected to said drying portion via a plate-shaped member having a connecting portion which corresponds to said at least one fourth positioning member.

15. A photosensitive material processing apparatus which exposes an image on a negative film onto a photographic paper, comprising:

a base member having a plurality of positioning means, said plurality of positioning means comprising a first positioning means, a second positioning means and a third positioning means;

a negative table mounted to said base member via said first positioning means so as to be positioned relative to said base member, for supporting the negative film;

at least one optical system supporting member mounted to said base member via said second positioning means so as to be positioned relative to said base member, for supporting optical system components which guide an exposure light beam for exposing the image on the negative film; and a guide member mounted to said base member via said third positioning means so as to be positioned relative to said base member, for guiding the photographic paper during an exposure process, wherein said second positioning means comprises two positioning members, and wherein said at least one optical system supporting member comprises a first optical system supporting member and a second optical system supporting member, said first and second optical system supporting members each being connected to a respective one of said two positioning members.

16. A photosensitive material processing apparatus which exposes an image on a negative film onto a photographic paper, comprising:

a frame having an opening therein;

a base member received in the opening of said frame and having a plurality of positioning means, said plurality of positioning means comprising a first positioning means, a second positioning means and a third positioning means;

a negative table mounted to said base member via said first positioning means so as to be positioned relative to said base member, for supporting the negative film;

at least one optical system supporting member mounted to said base member via said second positioning means so as to be positioned relative to said base member, for supporting optical system components which guide an exposure light beam for exposing the image on the negative film; and a guide member mounted to said base member via said third positioning means so as to be positioned relative to said base member, for guiding the photographic paper during an exposure process.

* * * * *